United States Patent Office 3,040,074
Patented June 19, 1962

3,040,074
ANTI-CORROSIVE MINERAL OIL COMPOSITIONS
David B. Sheldahl, Griffith, Ind., and Thomas O. Counts, Park Forest, Ill., assignors, by mesne assignments, to Sinclair Research, Inc., New York, N.Y., a corporation of Delaware
No Drawing. Original application Sept. 6, 1957, Ser. No. 682,281. Divided and this application Jan. 11, 1961, Ser. No. 86,839
3 Claims. (Cl. 260—401)

The present application is a division of application Serial No. 682,281, filed Sept. 6, 1957.

This invention relates to new compositions of matter and to a novel class of chemical compounds derived from the reaction of a dicarboxylic acid with a fatty amido diamine and aromatic sulfonic acid. In other aspects the invention is directed to the use of novel compounds as corrosion inhibitors for mineral oil products which normally come in contact with metallic surfaces.

Various corrosion inhibitors have been suggested for use in liquid mineral oil bases for protection of metal surfaces which come in contact with the oil. Although many inhibitors in some respects provide satisfactory protection, quite frequently the inclusion of an inhibitor in a distillate fuel, for example, proves disadvantageous inasmuch as the films produced therefrom frequently fail to exhibit sufficient resistance to moisture, especially under high humidity conditions. In many instances various additive materials which have been proposed for the protection of lubricant systems are not applicable in practice since their influence on the lubricant action is deleterious as, for example, by forming a combustion ash when the lubricant is subjected to relatively high temperatures.

In accordance with this invention we have found that corrosion problems occurring from mineral oils contacting metallic surfaces can be materially lessened through use of novel corrosion inhibitors prepared by reacting certain fatty amido diamines, dicarboxylic acids and aromatic sulfonic acids. The inhibitor products are identified as disulfonate fatty amido diamine salts of dicarboxylic acids and as shown hereinafter, these reaction products have been found to exhibit marked protection of metal surfaces, particularly ferrous surfaces, which are in contact with liquid mineral oil products containing small amounts of moisture. When blended in mineral oil products such as gasoline and diesel fuel, such fuels easily pass humidity cabinet corrosion tests which thus indicates their resistance to moisture under high humidity conditions. Moreover, the inhibitors give protection in static and dynamic systems, e.g. storage tanks and pipe lines. The novel inhibitor products of this invention effectively prevent corrosion without influencing basic characteristics of the mineral oil products in which they are incorporated and are further advantageous in that they will not form a combustion ash upon being subjected to relatively high temperatures.

The corrosion inhibiting compositions of this invention are formed by adding to a suitable mineral oil base a compound or mixture of compounds having the formula:

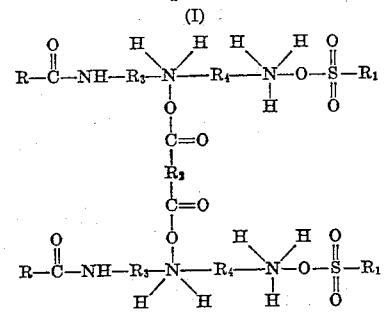

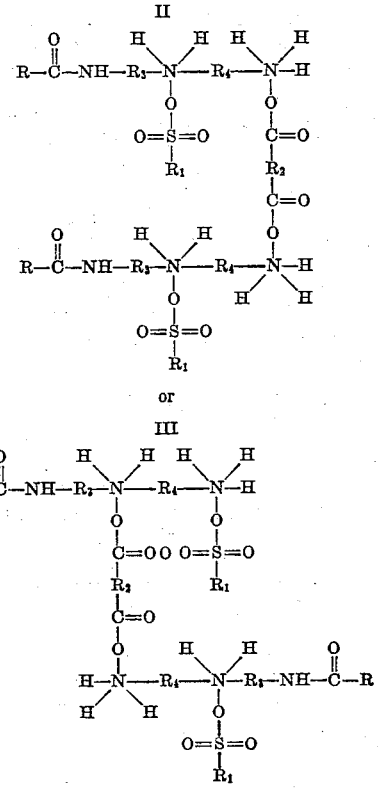

in which R represents a monovalent hydrocarbon radical containing from about 6 to 22 carbon atoms; $R_1$ is an aromatic radical or residue derived from aromatic sulfonic acids; $R_2$ is a divalent hydrocarbon radical of a dicarboxylic acid containing from about 0 to 36 carbon atoms; and $R_3$ and $R_4$ each represent divalent aliphatic hydrocarbon radicals containing from about 2 to 8 carbon atoms. Each of the groups R, $R_2$, $R_3$ and $R_4$ may be saturated or unsaturated, alike or different, straight chain or branched chain, are preferably straight chain, and may contain substituent groups such as amino, halogen, hydroxy, nitrile and the like.

The corrosion inhibiting compounds of the invention are identified as disulfonate fatty amido diamine salts of dicarboxylic acids and are mineral oil-compatible; that is, the compounds are dispersible, soluble or miscible without continuing agitation. The novel compounds are easily prepared, for example, by reacting an aromatic sulfonic acid and dicarboxylic acid in stoichiometric amounts with a fatty amido diamine. If desired, more than the stoichiometric amount of reactants may be used and the excess can be included with the principal corrosion inhibiting salt when added to the mineral oil base. The stoichiometric amounts of the reactants are approximately 2 moles of the fatty amido diamine to 2 moles of the sulfonic acid to 1 mole of the dicarboxylic acid. The reaction is almost instantaneous if carried out at temperatures between about 100 and 120° F. but will occur slowly at room temperature. Higher temperatures below the decomposition point of the reactants or product may be employed and the reaction can be carried out in the presence of a solvent. No special equipment is required and any suitable pot type reactor can be employed. In addition to the reaction product containing one to three of the compounds of Formulae I, II and III, other materials may be formed in the reaction and included in the corrosion inhibitor.

The fatty amido diamines which are used in accordance with the invention are represented by the following general formula:

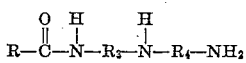

in which R is a monovalent hydrocarbon group containing at least about 6 and preferably 12 to 22 carbon atoms and $R_3$ and $R_4$ are as described above. Preferably, $R_3$ and $R_4$ are polymethylene groups of about 2 to 8 carbon atoms and advantageously about 2 to 4 carbon atoms. The members of this class of diamine compounds are cationic and possess one primary and secondary amine group in addition to an acyl radical attached to the amide nitrogen. The acyl radical in the above formula may be straight or branched chain, or alicyclic, may contain substituent groups such as halogen, amino, hydroxy, nitrile, and the like, and is preferably an aliphatic carboxylic acid residue of high molecular weight fatty acids, either saturated or unsaturated. Examples of such acids are oleic acid, stearic acid, palmitic acid, linoleic acid, linolenic acid, ricinoleic acid, monohydroxy stearic acid, lauric acid, high molecular weight naphthenic acids, fatty acids obtained from the oxidation of petroleum waxes, and the like. Fatty acids which are particularly desirable for providing the carboxylic acid residue can be obtained from vegetable oils and animal fats such as soybean oil, coconut oil, lard oil, corn oil, castor oil, tallow, and the like. Other suitable carboxylic acid residues having the desired number of carbon atoms are the acids obtained from tall oil which contains a mixture of fatty acids and resin acids.

The fatty amido diamines can be prepared by reacting a polyalkylene triamine of the formula $$NH_2([CH_2]_n-NH)_2H$$

in which $n$ is a number from about 2 to 8, preferably 2 to 4, with a carboxylic acid or a derivative thereof, such as an ester, anhydride, or halide in such proportions and under such conditions as to effect monoacylation of one primary amino group present in the polyalkylene triamine. Fatty glycerides are examples of esters that are good acylating agents, and particularly preferred materials are corn oil or tallow which provide a saturated and unsaturated aliphatic hydrocarbon group of from about 16 to 18 carbon atoms. Other methods of preparation which are satisfactory include reaction of the desired fatty acid with ammonia to obtain the corresponding amide. The amide is then reacted twice with acrylonitrile with each reaction being followed by hydrogenation to produce the final fatty amido diamine product.

An example of a preferred fatty amido diamine used in the preparation of the corrosion inhibitors of this invention is a commercial product designated as "Diamine 257" which corresponds to the above fatty amido diamine formula in which $R_3$ and $R_4$ are trimethylene and R is the straight chain unsaturated hydrocarbon radical derived from corn oil and having about 16 to 18 carbon atoms. This product is well-known, being marketed by Leyda Oil and Chemical Works, and is characterized by having an acid number of less than 5, an average amine equivalent weight of 210, and one primary and secondary basic amine group. The product has an appearance of a viscous liquid or fluid paste and has a density of 0.935 at 25° C.

The dicarboxylic acids used in the invention are of the general formula $R_2(COOH)_2$ wherein $R_2$ is a divalent hydrocarbon radical containing from about 0 to 36 carbon atoms. The useful acids have a molecular weight of up to about 600 and include, among others, such saturated dibasic acids as malonic, azelaic, oxalic, succinic, glutaric, adipic, suberic and pimelic, as well as the unsaturated acids, fumaric, maleic and glutaconic. These acids may be substituted or unsubstituted and for the most part selection of a useful dicarboxylic acid will depend upon cost and convenience of manufacture. Other dicarboxylic acid materials which can be employed are the propylene polymer adducts of succinic acid anhydride. When this material is reacted with the fatty amido diamine and aromatic sulfonic acids, the reaction products include a mixture of compounds rather than a single compound.

A particularly suitable dicarboxylic acid employed in this invention is dimerized ricinoleic acid, a dimer by definition being the product obtained when two molecules of a monocarboxylic acid condense to form a dicarboxylic acid. A source of the dimerized ricinoleic acid used in this invention is the still residue obtained in the dry distillation of castor oil carried out in the presence of sodium hydroxde. This material is well known and is described in U.S. Patent No. 2,632,695. The commercially available materials seldom contain 100% dimeric acid and accordingly the useful acids contain a predominant amount of dimerized ricinoleic acid together with small amounts of trimeric and higher polymeric acids, monocarboxylic acids, and unpolymerized fatty acids derived from the castor oil.

The sulfonic acid materials which can be used in the preparation of the corrosion inhibitors of this invention are the aromatic sulfonic acids including those derived from petroleum products. The useful petroleum sulfonic acids thus include the water-soluble or water-dispersible green acids and the preferentially oil-soluble acids referred to as mahogany acids. The green acids are found in the acid sludge resulting from the treatment of a suitable petroleum oil, such as a liquid petroleum distillate boiling in the range of 600 to 1000° F., with fuming sulfuric acid or sulfur trioxide, and are in fact mixtures of water-soluble sulfonic acids known as black acids, intermediate detergent-type sulfonic acids, and oil-soluble sulfonic acids called brown acids. The green acids are hydrophilic in character and can be recovered from the acid sludge by adding water to the sludge to dilute the sulfuric acid therein to a concentration of about 20 to 30%, at which concentration the green acids separate to form the supernatant layer, or they can be extracted from the sludge by using water-soluble solvents. The mahogany acids some of which show limited hydrophilic properties, are oil-soluble or hydrophobic by nature and can be recovered from the acid treated oil or obtained as a concentrate in the acid oil varying from 10 to 50% by weight. The useful mahogany acids generally have a molecular weight of from about 300 to 500, or more, and although their exact chemical structures may vary, it appears that such acids are composed to a large extent of sulfonated aromatic hydrocarbons having either one or two aromatic rings per molecule possibly with one or more long-chain alkyl groups containing from about 8 to 30 carbon atoms attached to the ring nuclei.

Suitable sulfonic acids which include both the oil and water-soluble petroleum sulfonic acids are the aryl sulfonic acids, benzene sulfonic acids, cymene sulfonic acid, naphthalene sulfonic acid, alkylated naphthalene sulfonic acid, fatty sulfonic and fatty aromatic sulfonic acids. Other useful aromatic sulfonic acids are the oil-soluble ammonia neutralized sulfonated mixtures of polyalkylated benzenes; alkyl aryl sulfonic acids in which the alkyl chain contains from about 8 to 18 carbon atoms; synthetic sulfonic acids prepared by reaction of paraffin wax chains of 20 or more carbons with aromatic nuclei which are sulfonated by fuming sulfuric acid, e.g. wax substituted naphthalane; ammonium mahogany sulfonic acids obtained by reaction of ammonia with sulfuric acid treated hydrocarbon oils, ammonium sulfonates of the alkyl aryl sulfonic acids, particularly those having a monocyclic nucleus; all of which are available or may be readily prepared by known methods. Particularly suitable sulfonic acid materials are ammonia neutralized sulfonated Neolene bottoms described in U.S. Patent No. 2,671,757 to T. G. Wisherd, and the ammonium mahogany sulfonates described in U.S. Patent No. 2,632,694 to F. M. Watkins. The aromatic oil-soluble sulfonic acids are conveniently employed as a concentrate in the oil from which they are derived and are usually present as a 10 to 30 weight percent concentration.

The disulfonate fatty amido diamine salts of dicarboxylic acids of this invention are effective in liquid petroleum hydrocarbons such as light distillates, i.e. liquid hydrocarbons boiling up to and including gas oils, and lubricating oils. As examples they can be employed in gasoline, kerosene, petroleum solvents, diesel fuels, heating oils, neutral oils, etc. The amount employed in a given instance will depend upon the character of the base oil and the degree of corrosion inhibition desired with a small but sufficient amount being employed to give substantial corrosion inhibition. Generally, the inhibitor will comprise from about 0.001 to 5.0 weight percent or more of the total composition with larger amounts being used as the specific gravity or viscosity of the base oil increases. As examples, with gasoline the amount of inhibitor will vary generally from about 0.001 to 2 weight percent of the total composition including the base oil with about 0.5 to 2% being particularly useful for humidity cabinet protection. On the same basis about 0.001 to 3 weight percent of inhibitor would normally be used in diesel fuel with about 0.75 to 3% being preferred for flushing compositions. The corrosion inhibitors of the present invention may be used alone or in combination with other additives such as anti-foam agents, detergent additives, pour depressants, viscosity index improvers, etc., which improve the composition in one or more respects. Since the mineral oil is present in relatively large and major amounts the optimum concentration of any combination of additives will, of course, depend upon the particular type of mineral oil base stock and the potency of the additive combination contained therein.

The following specific examples will serve to illustrate the present invention but they are not to be considered limiting.

*Example I*

A corrosion inhibitor of this invention was prepared by reacting 7.9 parts by weight of dimerized ricinoleic acid with 10 parts by weight of "Diamine 257" and 82.1 parts by weight of mahogany sulfonic acids (10% solution in its base petroleum oil; 300 SUS at 100° F., Acid No. 16.4). The reaction was carried out at a temperature of 100 to 120° F. and a clear homogeneous solution resulted which was a 26% concentrate of the fatty amido diamine dicarboxylate disulfonate. The solution had the following characteristics.

| | |
|---|---|
| Gravity, API | 21.4 |
| Viscosity, SUS at 100° F | 3089 |
| Viscosity, SUS at 210° F | 106.3 |
| Flash, ° F | 380 |
| Fire, ° F | 440 |
| Pour, °F | +25 |
| Color, NPA | Dark |
| Acid number | 25.6 |
| Saponification number | 26.2 |
| Nitrogen, % | 0.98 |
| Sulfur, % | 0.74 |

*Example II*

A corrosion inhibitor was prepared in the above manner except that a fatty diamine was used in place of the fatty amido diamine. The diamine was of the formula $RNH-(CH_2)_3-NH_2$ in which R is the straight chain hydrocarbon radical of 16 to 18 carbon atoms, saturated and unsaturated, derived from tallow fatty acids. The reaction product is identified as a fatty diamine dicarboxylate disulfonate and was obtained as a 21% concentrate which had the following characteristics:

| | |
|---|---|
| Gravity, API | 22.4 |
| Viscosity SUS, at 100° F | 1721 |
| Viscosity SUS, at 210° F | 98.2 |
| Flash, ° F | 375 |
| Fire, ° F | 425 |
| Pour, ° F | −10 |
| Color, NPA | Dark |
| Acid number | 25.6 |
| Saponification number | 26.8 |
| Nitrogen, % | 0.77 |
| Sulfur, % | 0.83 |

In order to show the outstanding corrosion characteristics of the compounds of this invention, the novel inhibitor as prepared in Example I was blended with diesel fuel and subjected to a humidity cabinet corrosion test identified as the MIL-L-21260 type specification (lubricating oil, internal combustion engine, preservative). This test is carried out as follows: Small sand blasted mild steel panels are dipped in the petroleum hydrocarbon and after draining two hours at room temperature are suspended in a highly humid atmosphere, generally about 100% humidity at 120° F., in a special cabinet. The time of initial corrosion of the panels is noted. The humidity cabinet is provided with heating units and thermal regulators for automatic temperature control. A water level of 8 inches is maintained in the bottom of the cabinet and 8 linear feet per hour of clean air is bubbled through the water to assure high humidity at all times. The steel panels are suspended by stainless steel hooks around the periphery of the humidity cabinet. About three complete changes of air per hour are provided in the cabinet. In order to pass the test no more than 3 rust spots 1 mm. in diameter should be observed on the panel after 6 days exposure in the cabinet.

A summary of the humidity cabinet results obtained when using the disulfonate fatty amido diamine salts of dicarboxylic acids as a corrosion inhibitor in diesel fuel is shown below. The diesel fuel employed had an API gravity of 38.6, a boiling range of 370 to 640° F. and an SUS viscosity of 35.6 at 100° F. The effectiveness of the novel inhibitor as prepared in Example I is revealed by the number of days the panel is exposed before failure occurred. As compared to the disulfonate fatty diamine salt of dicarboxylic acids of Example II, striking differences in results were obtained. At the same concentration of 0.63% the reaction product of Example I gave good protection for over twenty-one days whereas the fatty diamine salt of Example II was substantially less effective.

TABLE I

*MIL-L-21260 Humidity Cabinet Test Results*

| Inhibitor | Concentration Weight Percent Dry Soap Basis | Cabinet Life, Diesel Fuel, Days [1] |
|---|---|---|
| None | None | 1− |
| Fatty amido Diamine Dicarboxylate Disulfonate, as prepared in Ex. I | 0.42 | 14.5 |
| | 0.63 | 21+ |
| Fatty Diamine Dicarboxylate Disulfonate, as prepared in Ex. II | 0.42 | 3.5 |
| | 0.63 | 13.0 |

[1] Number of days before two or three rust spots 1 mm. in diameter appear on test panel.

The following data of Table II illustrate the results obtained when the compounds prepared in accordance with the present invention were tested in mineral oil products such as gasoline and diesel fuel for dynamic corrosion inhibition properties. The reaction product of Example II, which does not contain the amide linkage is used for comparison purposes with the composition of the present invention (Example I) which employs a fatty amido diamine as the amine constituent. The Dynamic Corrosion Test is a modification of ASTM test D-665-47T for rust-preventing characteristics of steam turbine oil in the presence of water and is useful for determining the protection afforded by corrosion inhibitors in dynamic systems, e.g. as in pipe lines. In this modified procedure, a freshly ground rust test coupon consisting of ½-inch diameter by 5½ inches long mild steel rod is suspended in a 400 ml. beaker equipped with a stirrer and placed in a temperature controlled bath capable of maintaining the temperature at 100±1° F. The test fuel (350 ml.) is added and stirred for thirty minutes to allow the rust inhibitor to precoat the test specimen. Part (50 ml.) of the test fuel is then removed and 30 cc. of distilled water is added. The mixture is stirred for a four-hour test period. At the end of this period, the coupon is removed, dried with suitable solvents, inspected and rated according to the following scale:

| | |
|---|---|
| No rust | A |
| Trace rust (covering a maximum of 0.25% of total surface area) | B++ |
| 0.25 to 5% of surface area covered by rust | B+ |
| 5 to 25% of surface area covered by rust | B |
| 25 to 50% of surface area covered by rust | C |
| 50 to 75% of surface area covered by rust | D |
| 75 to 100% of surface area covered by rust | E |

The test conditions are substantially more severe than ordinary conditions encountered so the results give a clear indication of the effectiveness and amount of the novel corrosion inhibitors required in the particular oil tested to obtain a rating of B++ or better.

TABLE II

| Inhibitor | Prepared As in Ex. | Dynamic Test Results* | |
|---|---|---|---|
| | | Gasoline [1] | Diesel Fuel [2] |
| None | | | |
| Fatty Amido Diamine Dicarboxylate Disulfonate | I | 2.6 | 1.7 |
| Fatty Diamine Dicarboxylate Disulfonate | II | 1.7 | 1.3 |

*Pounds of inhibitor (dry soap basis) per 1,000 barrels of hydrocarbon to obtain a B++ rating or better in the modified ASTM D-665 Test.
[1] API gravity of 62.6; Reid Vapor Pressure 9.0; boiling range of 96 to 405° F.; ASTM Gum 2.7.
[2] See Table I.

The reaction products of Examples I and II were added to diesel fuel and evaluated in accordance with the following static test procedure. A flat strip of mild carbon steel (⅛″ x ½″ x 5⅞″) is cleaned with naphtha or other solvent to remove grease and oil and then polished with emery cloth until no rust or pits remain. During and after these polishing operations the strip should be handled with a clean lintless cloth or a piece of facial tissue. After the strip has been thus prepared it should be carefully wiped free of emery dust. The specimen together with 90 ml. of the sample to be tested are placed in a corked 4-ounce oil sample bottle which is allowed to lie on its side at room temperature for 1 hour. The liquid should cover the test specimen during this contact period. Then add 10 ml. of distilled water, cork tightly, and shake vigorously for 2 minutes to insure water wetting over the entire strip surface. The specimen should be tightly wedged between the cork and the bottom of the bottle to minimize breakage. The bottle is then restored to an upright position and allowed to stand at room temperature. The specimen is examined for rust daily, and after each day the bottle is shaken to replace water droplets on the specimen in the hydrocarbon phase that may have been disturbed during inspection. When 25% of the specimen exposed in the aqueous phase becomes rusted the test has failed. The tests are run in quadruplicate and the average failure time measured in hours is reported.

As shown below in Table III, the inhibitor compound of Example I gave excellent corrosion protection as indicated by the passing of 3048 hours before 25% of test coupon had rusted. The significance of the static test shows the usefulness of the inhibitor in systems where the hydrocarbon stock does not flow past a metal surface, e.g. as in a storage tank. For purposes of comparison a fatty amido diamine monocarboxylate monosulfonate and fatty diamine monocarboxylate monosulfonate are also shown.

TABLE III

| Inhibitor | As Prepared in Ex. | Static Test Results | |
|---|---|---|---|
| | | Inhibitor Conc.[1] | Hours [2] |
| None | | None | 1.5 |
| Fatty Amido Diamine Dicarboxylate Disulfonate | I | 9 | 3,048+ |
| Fatty Diamine Dicarboxylate Disulfonate | II | 9 | 1,128 |
| Fatty Diamine Monocarboxylate Monosulfonate [3] | | 9 | 162 |
| Fatty Amido Diamine Monocarboxylate Monosulfonate [4] | | 9 | 642 |

[1] Pounds per thousand barrels (dry soap basis).
[2] Hours before 25% of the area of coupon exposed to the aqueous phase has rusted.
[3] Prepared by reacting 15.5 parts by weight of the mono-oleate salt of a fatty diamine with 84.5 parts by weight of mahogany sulfonic acids (10% solution in its base petroleum oil; 300 SUS at 100° F.; Acid No. 16.4). The fatty diamine was the same as used in Example II.
[4] Prepared by reacting 6 parts by weight of oleic acid and 83.5 parts by weight of mahogany acids with 10.5 parts by weight of "Diamine 257." The diamine and mahogany acid were the same as used in Example I.

It is claimed:
1. A chemical compound selected from the formulae

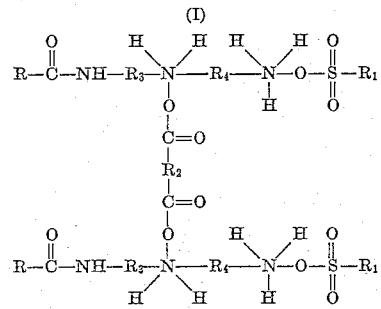

(I)

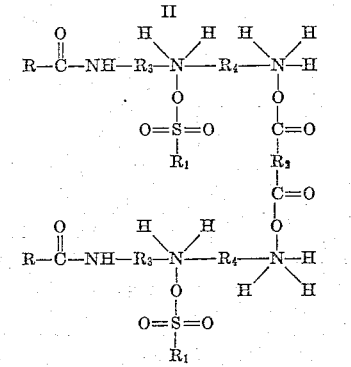

II

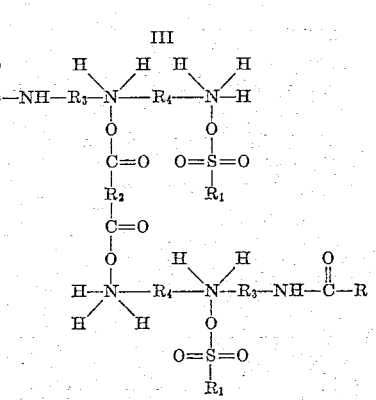

and

III in which R represents a monovalent hydrocarbon radical containing from about 6 to 22 carbon atoms; $R_1$ is the aromatic hydrocarbon radical of an aromatic sulfonic acid; $R_2$ is a divalent hydrocarbon radical derived from a dicarboxylic acid containing from about 0 to 36 carbon atoms; and $R_3$ and $R_4$ each represent divalent aliphatic hydrocarbon radicals containing from about 2 to 8 carbon atoms.

2. The compound of claim 1 wherein R is an aliphatic fatty acid hydrocarbon radical derived from a member selected from the group consisting of corn oil and tallow; and $R_3$ and $R_4$ each contain from 2 to 4 carbon atoms.

3. The compound of claim 2 wherein $R_1$ is the aromatic hydrocarbon radical present in mahogany sulfonic acid; $R_2$ is the hydrocarbon radical of dimerized ricinoleic acid and $R_3$ and $R_4$ each contain 3 carbon atoms.

No references cited.